United States Patent
Li et al.

(10) Patent No.: US 9,618,046 B2
(45) Date of Patent: Apr. 11, 2017

(54) OIL DISCHARGING SYSTEM FOR MAIN SHAFT BEARING OF WIND TURBINE GENERATOR

(71) Applicant: CNR WIND TURBINE CO., LTD., Jinan (CN)

(72) Inventors: Guangwei Li, Jinan (CN); Shuliang Wu, Jinan (CN); Chunli Ge, Jinan (CN); Liangfeng Yu, Jinan (CN); Lei Zhao, Jinan (CN); Xingcun Yan, Jinan (CN)

(73) Assignee: CNR WIND TURBINE CO., LTD., Shandong (CN)

( * ) Notice: Subject to any disclaimer, the term of this patent is extended or adjusted under 35 U.S.C. 154(b) by 0 days.

(21) Appl. No.: 14/565,079

(22) Filed: Dec. 9, 2014

(65) Prior Publication Data

US 2016/0115943 A1 Apr. 28, 2016

(30) Foreign Application Priority Data

Oct. 28, 2014 (CN) .......................... 2014 1 0588639

(51) Int. Cl.
- *F16C 19/00* (2006.01)
- *F16C 33/80* (2006.01)
- *F16C 33/66* (2006.01)
- *F03D 80/70* (2016.01)

(52) U.S. Cl.
CPC .............. *F16C 33/80* (2013.01); *F03D 80/70* (2016.05); *F16C 33/6685* (2013.01); *F16C 2360/31* (2013.01)

(58) Field of Classification Search
CPC .. F16C 33/6681; F16C 33/6685; F16C 33/76; F16C 33/7886; F16C 33/80; F16C 2360/31; F03D 11/0008
See application file for complete search history.

(56) References Cited

U.S. PATENT DOCUMENTS

| 4,422,698 A * | 12/1983 | Aoki ...................... B21B 31/07 384/482 |
| 5,655,862 A * | 8/1997 | Kato .................. B23Q 11/0883 384/130 |
| 8,624,455 B2 * | 1/2014 | Friedl ................. F16C 33/6607 310/425 |

FOREIGN PATENT DOCUMENTS

DE 1600336 * 2/1970

* cited by examiner

*Primary Examiner* — James Pilkington
(74) *Attorney, Agent, or Firm* — J.C. Patents

(57) ABSTRACT

An oil discharging system for a main shaft bearing of a wind turbine generator, includes: a main shaft bearing, a bearing seal, a bearing end cover, a waste oil through hole, at least one thumb wheel; the bearing seal is sleeved to an end of the main shaft bearing, the bearing end cover is engaged with the bearing seal to encircle the outside of the bearing seal; the waste oil through hole is provided on the bearing end cover; the at least one thumb wheel is provided on the bearing seal, enables the waste oil been discharged from the waste oil through hole after the thumb wheel acts upon. Since the thumb wheel rotates with the main shaft bearing, so that the waste oil discharge from the waste oil through hole effectively, thus pollutions to the wind turbine generator and surroundings thereof are reduced.

11 Claims, 2 Drawing Sheets

OIL DISCHARGING SYSTEM FOR MAIN SHAFT BEARING OF WIND TURBINE GENERATOR

CROSS-REFERENCE TO RELATED APPLICATIONS

This application claims priority to Chinese Patent Application No. 201410588639.6, filed on Oct. 28, 2014 and entitled "OIL DISCHARGING SYSTEM FOR MAIN SHAFT BEARING OF WIND TURBINE GENERATOR", which is hereby incorporated by reference in its entirety.

TECHNICAL FIELD

The present invention relates to the field of wind turbine generator manufacturing technologies and, in particular, to an oil discharging system for a main shaft bearing of a wind turbine generator.

BACKGROUND

In the prior art, a lip-type sealing ring or a labyrinth seal is commonly used for sealing an oil discharging system for a main shaft bearing of a wind turbine generator, and waste oil collecting holes are provided on bearing end covers at both ends of the main shaft bearing. The waste oil collecting holes are mainly used for discharging waste oil presenting in the main shaft bearing of the wind turbine generator.

Generally, a bearing housing of a wind turbine generator has a large cavity therein, which enables the cavity to accommodate a great amount of waste oil. The waste oil has a high viscosity and poor fluidity within the bearing housing, thus it is difficult for the waste oil to be discharged from the waste oil collecting holes. The waste oil grease, accumulated for long time, will be squeezed out in the entire circumferential direction from sealing layers at both ends of the main shaft bearing under pressure, which will cause serious pollutions to the entire wind turbine generator and surroundings. At present, there is no solution to solve the problem above in the prior art.

SUMMARY

The present invention provides an oil discharging system for a main shaft bearing of a wind turbine generator, which may achieve that the main shaft bearing of the wind turbine generator discharges oil effectively, and thus pollutions to the wind turbine generator and surroundings are reduced.

In a first aspect, the present invention provides an oil discharging system for a main shaft bearing of a wind turbine generator, including: a main shaft bearing, a bearing seal, a bearing end cover, a waste oil through hole and at least one thumb wheel; where the bearing seal is installed to an end of the main shaft bearing, the bearing end cover is engaged with the bearing seal to encircle the outside of the bearing seal; the waste oil through hole is provided on the bearing end cover; the at least one thumb wheel is provided on the bearing seal, so that the waste oil is discharged from the waste oil through hole while the thumb wheel acts upon it.

With reference to the first aspect, in a first possible embodiment of the first aspect, the thumb wheel includes: a first panel and a second panel; the first panel and the second panel are disposed perpendicular to one another.

With reference to the first possible embodiment of the first aspect, in a second possible embodiment of the first aspect, the first panel and the second panel are connected by means of welding.

With reference to the first aspect or the first possible embodiment or the second possible embodiment of the first aspect, in a third possible embodiment of the first aspect, the thumb wheel and the bearing seal are connected by means of bolts or slot fixing or welding or adhering.

With reference to the first aspect or the first possible embodiment or the second possible embodiment of the first aspect, in a fourth possible embodiment of the first aspect, the second panel of the thumb wheel and the axis of the main shaft bearing form an angle θ, wherein, 0<θ<90°.

With reference to the first aspect or the first possible embodiment or the second possible embodiment of the first aspect, in a fifth possible embodiment of the first aspect, if the oil discharging system employs a labyrinth sealing manner, then the bearing seal is a sealing ring.

With reference to the fifth possible embodiment of the first aspect, in a sixth possible embodiment of the first aspect, the sealing ring is provided with at least one open slot; and the thumb wheel is provided in the open slot.

The present invention provides an oil discharging system for a main shaft bearing of a wind turbine generator, including: a main shaft bearing, a bearing seal, a bearing end cover, a waste oil through hole and at least one thumb wheel; where the bearing seal is sleeved to an end of the main shaft bearing, the bearing end cover is engaged with the bearing seal to encircle the outside of the bearing seal; the waste oil through hole is provided on the bearing end cover; the at least one thumb wheel is provided on the bearing seal, the thumb wheel rotates with the main shaft bearing, so that the waste oil is discharged from the waste oil through hole while the thumb wheel acts upon it, which may achieve that the main shaft bearing of the wind turbine generator discharges oil effectively, and thus pollutions to the wind turbine generator and surroundings are reduced.

DESCRIPTION OF EMBODIMENTS

In order to make objectives, technical solutions and advantages of the present invention more clear, the technical solutions in embodiments of the present invention are hereinafter described clearly and completely with reference to the accompanying drawings in embodiments of the present invention. Obviously, the described embodiments are only a part of embodiments of the present invention, rather than all embodiments of the present invention. All other embodiments obtained by persons of ordinary skill in the art based on embodiments of the present invention without any inventive efforts shall fall within the protection scope of the present invention.

Figure 1:
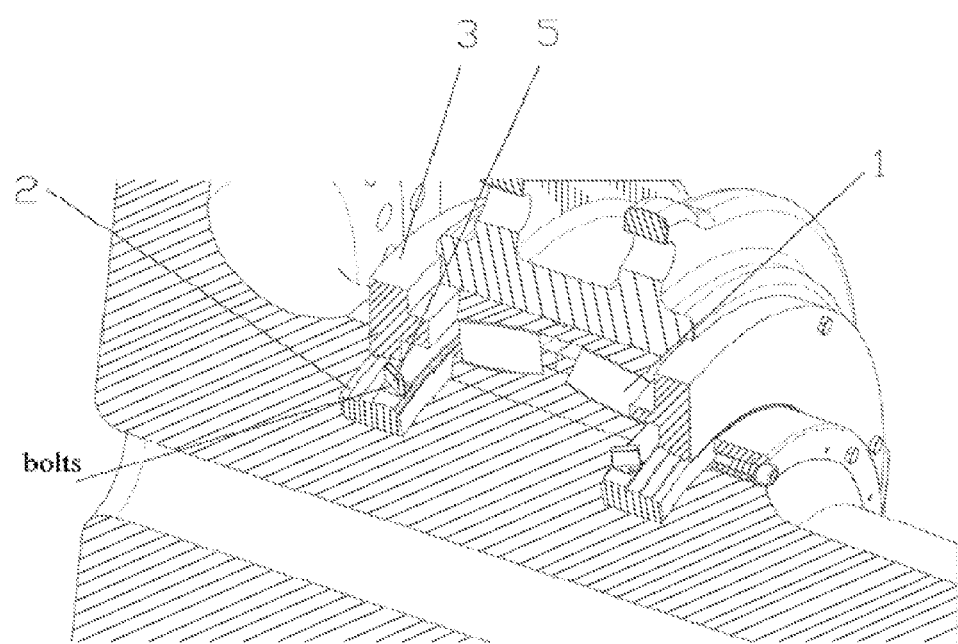
FIG. 1 is a schematic structural diagram of an oil discharging system for a main shaft bearing of a wind turbine generator according to an embodiment of the present invention.
Figure 2:
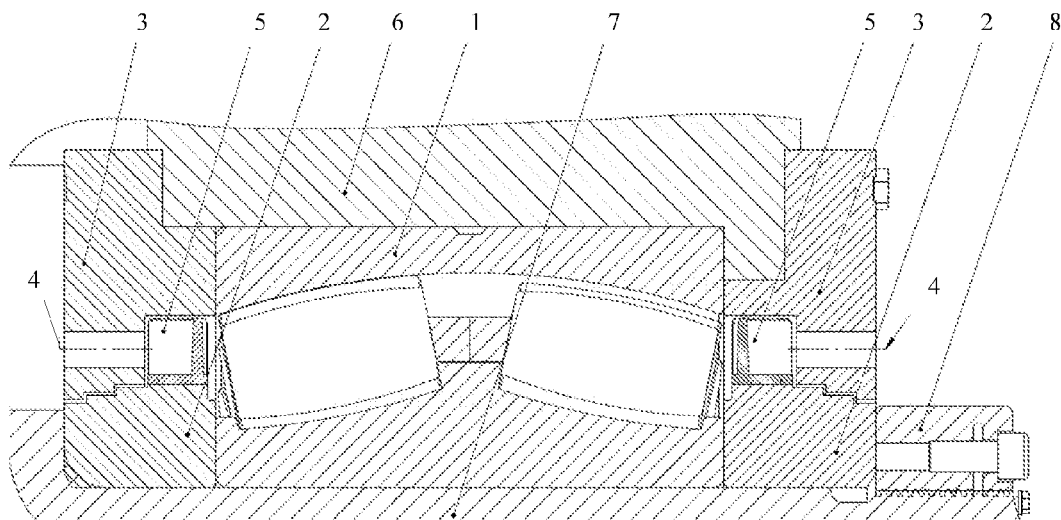
FIG. 2 is a cross section of an oil discharging system for a main shaft bearing of a wind turbine generator according to an embodiment of the present invention.

FIG. 1 is a schematic structural diagram of an oil discharging system for a main shaft bearing of a wind turbine generator according to an embodiment of the present invention; and FIG. 2 is a cross section of an oil discharging system for a main shaft bearing of a wind turbine generator according to an embodiment of the present invention. With reference to FIG. 1 and FIG. 2, the system includes: a main shaft bearing 1, a bearing seal 2, a bearing end cover 3, a waste oil through hole 4, and at least one thumb wheel 5; where the bearing seal 2 is sleeved to an end of the main shaft bearing 1, the bearing end cover 3 is engaged with the bearing seal 2 to encircle the outside of the bearing seal 2; the waste oil through hole 4 is provided on the bearing end cover 3; the at least one thumb wheel 5 is provided on the bearing seal 2, so that the waste oil is discharged from the waste oil through hole 4 after the thumb wheel 5 acts upon it. An oil discharging system for a main shaft bearing of a wind turbine generator, comprising: a main shaft bearing, a ring-shaped bearing seal having an outer sidewall, a ring-shaped bearing end cover having an inner sidewall, a waste oil through hole and at least one stirring plate; wherein, the ring-shaped bearing seal is sleeved to an end of the main shaft bearing, the ring-shaped bearing end cover is engaged with the ring-shaped bearing seal so that the inner sidewall of the ring-shaped bearing end cover encircles the outer sidewall of the ring-shaped bearing seal; the waste oil through hole is provided in the ring-shaped bearing end cover and in fluid communication with a ring-shaped cavity which is formed between the outer sidewall of the ring-shaped bearing seal and the inner sidewall of the ring-shaped bearing end cover and encircles the outer sidewall of the ring-shaped bearing seal; the at least one stirring plate is provided on the outer sidewall of the ring-shaped bearing seal and positioned within the ring-shaped cavity, wherein the stirring plate rotates to ether with the ring-shaped bearing seal and the main shaft bearing to stir waste oil within the ring-shaped cavity.

Specifically, operating principles of the oil discharging system lie in: when the main shaft bearing 1 is rotating clockwise, the lubricating oil is injected from the middle of the main shaft bearing 1 along the axial direction, the waste oil used by the main shaft 15 bearing 1 is discharged from both sides of the main shaft bearing 1 into a cavity of the bearing housing 6, for example, cavity 11 formed between the bearing end cover 3 and the bearing seal 2, the bearing housing 6 of the wind turbine generator usually has a large cavity inside, such that the cavity can accommodate a large amount of used oil therein, moreover, since a good seal is used, it is difficult for the waste oil to flow out from the seal, in a case of a relatively low internal pressure. Since the thumb wheel 5 in the oil discharging system provided by the present invention is arranged on the bearing seal 2, the bearing seal 2 and the thumb wheel 5 will rotate together with the main shaft bearing 1 when the main shaft bearing 1 rotates, thereby achieving a constant stirring of the waste oil within the cavity, at this time the waste oil within the cavity flows towards both sides of the main shaft bearing 1 respectively, under the action of the thumb wheel 5. In addition, since the bearing end cover 3 is provided with the waste oil through hole 4, when the thumb wheel 5 pushes the waste oil to the waste oil through hole 4, the waste oil can flow out from the waste oil through hole 4 then.

The number of the thumb wheel 5 described above can be determined according to actual needs, both sides of the main shaft bearing 1 are provided with at least one thumb wheel 5 generally, and the bearing end covers 3 at both sides are provided with at least one waste oil through hole 4 correspondingly, so that the waste oil can be discharged smoothly. Besides, the system also includes a main shaft 7, and is also provided with a lock nut 8.

Figure 3:
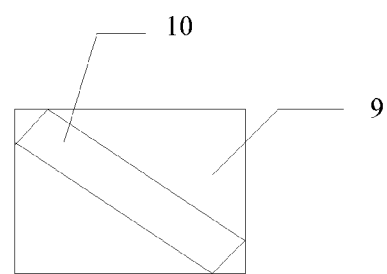
FIG. 3 is a schematic top view diagram of a thumb wheel according to an embodiment of the present invention.

FIG. 3 is a schematic top view diagram of a thumb wheel according to an embodiment of the present invention. With reference to FIG. 1 and FIG. 3, the thumb wheel 5 includes: a first panel 9 and a second panel 10; the first panel 9 and the second panel 10 are disposed perpendicular to one another. The second panel 10 of the thumb wheel 5 and the axis of the main shaft bearing 1 form an angle θ, wherein, 0<θ<90°, or 30<θ<60°.

It could be understand that, the thumb wheel 5 of present invention is not limited to the aforesaid structure. In another embodiment, the thumb wheel 5 comprises a first panel 9 sleeved on the out surface of the bearing seal 2, and at least one second panel 10 protruding upwardly form the first panel 9. The first panel 9 and the second panel 10 of the thumb wheel 5 may be formed integrally with the bearing seal 2. In a further embodiment, the thumb wheel 5 only comprises at least one second panel 10 protruding upwardly form the out surface of the bearing seal 2. The second panel 10 may be formed integrally with the bearing seal 2.

The first panel 9 and the second panel 10 of the thumb wheel 5 may be made of metal material or non-metal material, such as plastic. Optionally, in the case of the thumb wheel 5 and the bearing seal 2 formed integrally, both of them are made of same material.

Optionally, the first panel 9 and the second panel 10 are connected by means of welding.

In further, as shown in FIG. 1, the thumb wheel 5 and the bearing seal 2 are connected by means of bolts or slot fixing or welding or adhering, in particular, the first panel 9 is connected to the bearing seal 2 by means of bolts or slot fixing or welding or adhering. For example, screw holes are provided respectively on the first panel 9 and the bearing seal 2, so as to connect the first panel 9 and the bearing seal 2 by means of a bolt. Alternatively, in the case of the first panel 9 sleeved on the bearing seal 2, screws engaged with each other, are provided respectively on the first panel 9 and the bearing seal 2. Alternatively, a slot is provided on the bearing seal 2, and the thumb wheel 5 is clamped in the slot.

Optionally, the oil discharging system may employ a labyrinth sealing manner, and may also employ a sealing ring method. If the oil discharging system employs the labyrinth sealing manner, then the bearing seal 2 is a sealing ring. The bearing end cover 3 and the sealing ring constitute a labyrinth type sealing structure with a gap of 1 mm to 2 mm, that is, the stair shaped structure between the bearing end cover 3 and the bearing seal 2 as shown in FIG. 1 and FIG. 2. In this case, the sealing ring is provided with at least one open slot; and the thumb wheel is provided in the open slot. The bearing end cover 3 is engaged with the bearing seal to encircle the outside of the bearing seal; the waste oil through hole 4 is provided on the bearing end cover 3; the at least one thumb wheel 5 is provided on the bearing seal, so that the waste oil is discharged from the waste oil through hole 4 after the thumb wheel acts upon it.

In further, the thumb wheel 5 described above may be made of metal, and may also be made of other non-metallic materials. Moreover, the waste oil through hole 4 may be any shape, such as circular or square, which makes the waste oil to be discharged out easier. This aspect is not limited.

The present invention provides an oil discharging system for a main shaft bearing of a wind turbine generator, including: a main shaft bearing, a bearing seal, a bearing end cover, a waste oil through hole and at least one thumb wheel; where the bearing seal is sleeved to an end of the main shaft bearing, the bearing end cover is engaged with the bearing seal to encircle the outside of the bearing seal; the waste oil through hole is provided on the bearing end cover; the at least one thumb wheel is provided on the bearing seal, so that the waste oil is discharged from the waste oil through hole after the thumb wheel acts upon it, which may achieve that the main shaft bearing of the wind turbine generator discharges oil effectively, and thus pollutions to the wind turbine generator and surroundings thereof are reduced.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features; however, these modifications or replacements do not make the essence of corresponding technical solutions depart from the spirit and scope of the technical solutions in the embodiments of the present invention.

What is claimed is:

1. An oil discharging system for a main shaft bearing of a wind turbine generator, comprising: a main shaft bearing, a ring-shaped bearing seal having an outer sidewall, a ring-shaped bearing end cover having an inner sidewall, a waste oil through hole and at least one stirring plate;
    wherein, the ring-shaped bearing seal is sleeved to an end of the main shaft bearing, the ring-shaped bearing end cover is engaged with the ring-shaped bearing seal so that the inner sidewall of the ring-shaped bearing end cover encircles the outer sidewall of the ring-shaped bearing seal;
    the waste oil through hole is provided in the ring-shaped bearing end cover and in fluid communication with a ring-shaped cavity which is formed between the outer sidewall of the ring-shaped bearing seal and the inner sidewall of the ring-shaped bearing end cover and encircles the outer sidewall of the ring-shaped bearing seal;
    the at least one stirring plate is provided on the outer sidewall of the ring-shaped bearing seal and positioned within the ring-shaped cavity, wherein the stirring plate rotates together with the ring-shaped bearing seal and the main shaft bearing to stir waste oil within the ring-shaped cavity.

2. The oil discharging system according to claim 1, wherein the stirring plate comprises: a first panel and a second panel;
    the first panel and the second panel are disposed perpendicular to one another;
    wherein the first panel is provided in the outer sidewall of the ring-shaped bearing seal, and the second panel protrudes upwardly from the first panel.

3. The oil discharging system according to claim 2, wherein the stirring plate and the ring-shaped bearing seal are connected by means of bolts or welding or adhering.

4. The oil discharging system according to claim 2, wherein the second panel of the stirring plate and the axis of the main shaft bearing form an angle θ, wherein, $0<\theta<90°$.

5. The oil discharging system according to claim 2,
    wherein the outer sidewall of the ring-shaped bearing seal and the inner sidewall of the ring-shaped bearing end cover are of stair shaped structure, and constitute a labyrinth type sealing structure with a gap of 1 mm to 2 mm.

6. The oil discharging system according to claim 2, wherein the first panel and the second panel are connected by means of welding.

7. The oil discharging system according to claim 6, wherein the stirring plate and the ring-shaped bearing seal are connected by means of bolts or welding or adhering.

8. The oil discharging system according to claim 6, wherein the second panel of the stirring plate and the axis of the main shaft bearing form an angle θ, wherein, $0<\theta<90°$.

9. The oil discharging system according to claim 6,
    wherein the outer sidewall of the ring-shaped bearing seal and the inner sidewall of the ring-shaped bearing end cover are of stair shaped structure, and constitute a labyrinth type sealing structure with a gap of 1 mm to 2 mm.

10. The oil discharging system according to claim 1, wherein the stirring plate and the ring-shaped bearing seal are connected by means of bolts or welding or adhering.

11. The oil discharging system according to claim 1,
    wherein the outer sidewall of the ring-shaped bearing seal and the inner sidewall of the ring-shaped bearing end cover are of stair shaped structure, and constitute a labyrinth type sealing structure with a gap of 1 mm to 2 mm.

* * * * *